March 14, 1944. L. C. HOSFIELD 2,343,975
PROCESS AND APPARATUS FOR UNITING SHEETS OF THERMOPLASTIC MATERIALS
Filed June 20, 1941 2 Sheets-Sheet 1
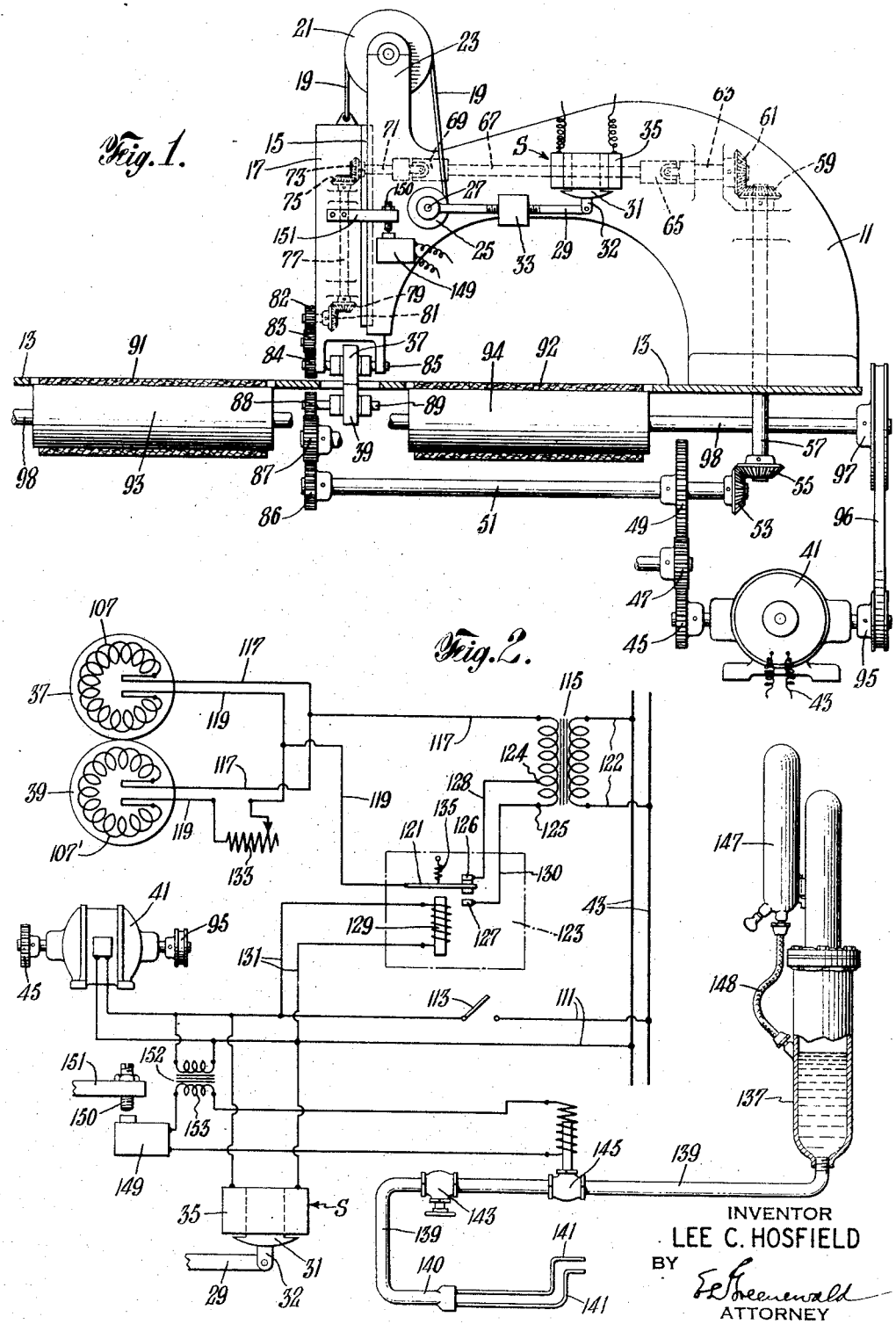
INVENTOR
LEE C. HOSFIELD
BY
ATTORNEY March 14, 1944. L. C. HOSFIELD 2,343,975
PROCESS AND APPARATUS FOR UNITING SHEETS OF THERMOPLASTIC MATERIALS
Filed June 20, 1941 2 Sheets-Sheet 2
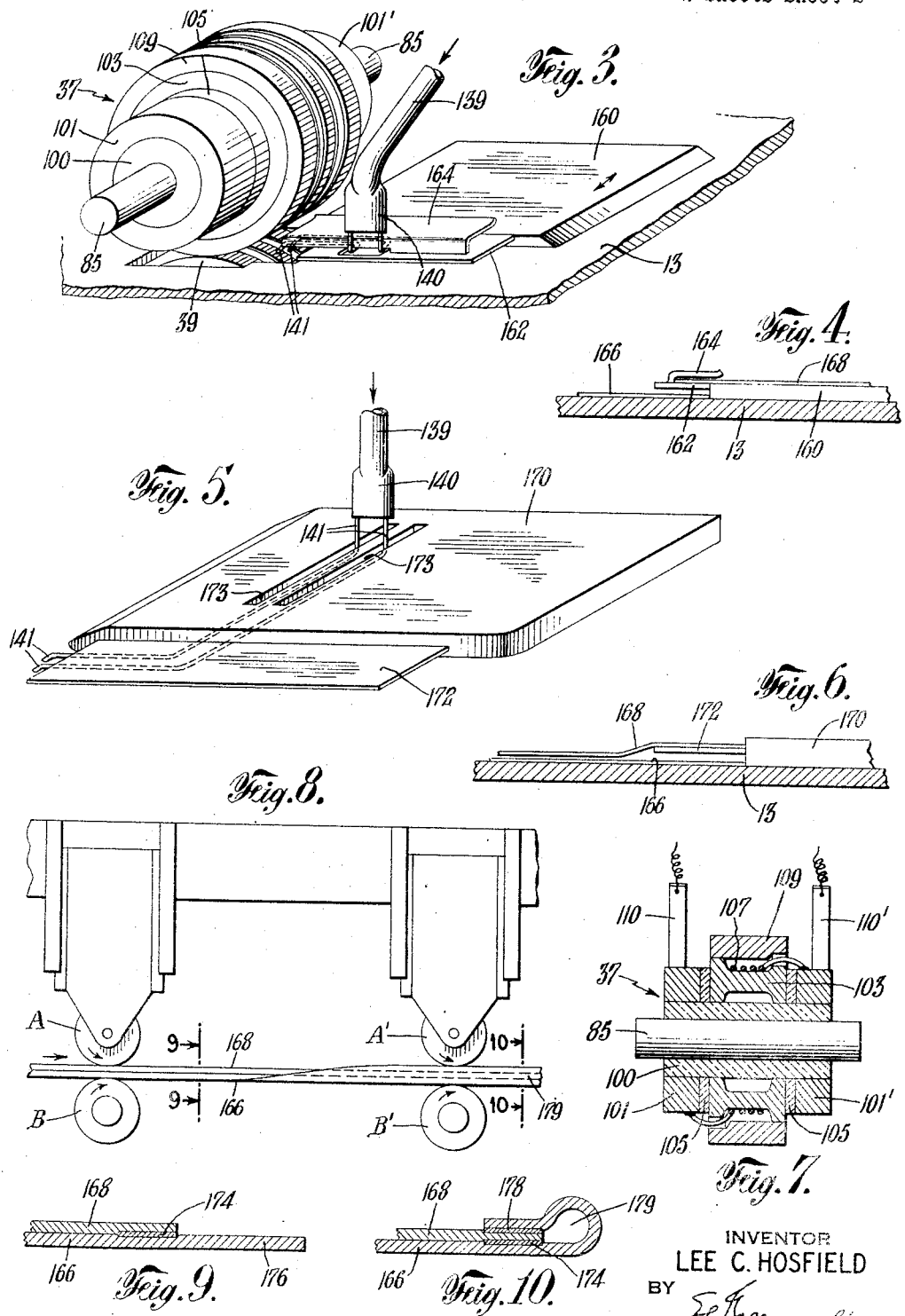
INVENTOR
LEE C. HOSFIELD
BY
ATTORNEY Patented Mar. 14, 1944

2,343,975

UNITED STATES PATENT OFFICE 2,343,975

PROCESS AND APPARATUS FOR UNITING SHEETS OF THERMOPLASTIC MATERIALS

Lee Conrad Hosfield, Parma, Ohio, assignor to National Carbon Company, Inc., a corporation of New York Application June 20, 1941, Serial No. 398,954

19 Claims. (Cl. 154—42)

This invention relates to the permanent welding or sealing of sheets and films of thermoplastic resins; and more particularly it concerns the production of shaped articles made of thermoplastic sheet materials, involving the permanent welding or uniting of selected areas of such materials by the concurrent application to such areas of a regulated amount of heat and pressure, and the use of a solvent, solvent mixture, of softening agent for the resinous material. It has especial utility for the continuous, permanent uniting of seams in films and sheets made from thermoplastic resins, either plasticized or unplasticized; and the uniting of resin-coated or impregnated paper, cloth and like materials, for fabrication purposes.

A large variety of articles of the nature of raincoats and other garments, shower curtains, umbrellas, dry goods sundries, and the like, made of relatively thin sheets and films of thermoplastic resin compositions, such as vinyl resins, are now being marketed in considerable volume. In the manufacture of such articles, it is often necessary to permanently unite the margins of two or more of such films. In the past, it has been customary to accomplish this by sewing the margins and forming seams by means of standard sewing machines utilizing thread of suitable material. Such operations involved the repeated puncturing of the sheeting by the fabricating needles. This has resulted in the substantial weakening of the material at and adjacent the seam. Moreover, it tends in many instances to cause distortion of the goods and to produce an unsightly wrinkling effect at the seam in the finished article. Such method of fabrication therefore has not been found satisfactory where seams of great strength and durability are required, and particularly where seams must be impervious to water and air.

Among the more important objects of the present invention are: to provide for permanently uniting sheets and films of thermoplastic materials; to provide in novel manner for preparing strong, durable, water-impervious seams in sheeting and films of thermoplastic resins; to provide for the fabrication of articles from sheets and films of thermoplastic resin without the use of thread or of similar materials in the form of thread; to provide for producing seams in sheets and films of thermoplastic resinous materials that equal or exceed in strength the resin film itself; to provide for the production of a heat-sealed seam which is relatively inconspicuous; and to provide heat-sealed seams of high quality, while minimizing production costs.

It has long been known that the margins of articles of thermoplastic resinous materials could be united by bringing the surfaces to be joined to a softening temperature and pressing the softened surfaces together. The practical adaptation of this knowledge for the continuous controlled heat-sealing of such surfaces has been prevented because of the fact that, at around the softening temperature, control of the shape of the article is lost. Furthermore, various components such as plasticizers and the like tend to segregate, thereby modifying the composition and physical properties of the thermoplastic material.

The use of solvents for softening the margins of surfaces of thermoplastic resinous materials to be joined also is well known. Here again the practical application of this knowledge to the continuous sealing of sheeting and films of such materials at a rapid, commercially practicable rate has heretofore not been attained due to the difficulty of preventing undue softening and deformation of, or other injury to, the margins of the resin film being united, and the difficulty of eliminating excess solvent without further injury to the material at the seam.

The present invention is based in important part on applicant's discovery that it is possible to produce continuously, in a commercially practicable manner, by the carefully controlled application of heat, pressure and minute quantities of suitable solvents or solvent-nonsolvent mixtures, heat-sealed seams in films and sheeting of thermoplastic resins, which seams are impervious to water and air, and which are at least the equal in strength of the resin film being fabricated.

For convenience, the invention will be more specifically described in conjunction with the permanent sealing or welding of the margins of sheets of vinyl resin compositions, although it will be understood that the process and apparatus have wide application for the heat-sealing of various thermoplastic compositions by the controlled use of heat, pressure and a solvent for such composition. The invention is particularly well adapted for the production of a continuous seam joining the margins of two endless sheets fabricated of a thermoplastic resin.

According to one form of the invention, the portions or areas of the sheets to be joined are passed at a uniform selected rate between a pair of driven sealing rolls which are maintained at a selected elevated temperature, and are so mounted that a selected pressure can be applied continuously upon successive portions of the areas to be united. When margins of sheet material are to be joined, suitable guides, hemmers, or other suitable feeding and guiding devices maintain the film margins in alignment during such operations. Preferably at a point close to and in front of the sealing rolls, a minute amount of a suitable solvent, or a mixture of solvents and/or nonsolvents, is applied continuously between the two film areas being united at a uniform rate during movement thereof at the heat-sealing station.

The solvent is dispensed continuously to the superposed margins or other areas of the films being joined in the necessary minute but uniform amounts, during movement of the rolls, and at no other time, through capillary tubes or the equivalent. The solvent flow is closely controlled, preferably by means of a uniform regulated fluid pressure and solvent discharge tubes of capillary size; or by means of a regulated capillary attraction of the solvent from a solvent reservoir through open capillary tubing to the point of application. If desired, the transfer of the solvent to successive portions of the margins or other areas of the moving films to be united may be facilitated by means of a wick, brush, or felt pad at the capillary tube outlet.

A wide variety of solvents and solvent mixtures may be utilized in the process, including carbocyclic and open-chain saturated and unsaturated ketones boiling within the range between 80° and 160° C., such as cyclopentanone, cyclohexanone, isophorone, mesityl oxide, dioxane and methyl ethyl ketone, and the higher ketones; and ethylene dichloride; with or without minor proportions of propylene oxide or other relatively low boiling solvent for the thermoplastic material. The selection of the solvent is dependent upon such factors as the nature of the thermoplastic material being heat-sealed, the rate of heat-sealing, the thickness of the films, the temperature of the sealing rolls, and the desired quality of the heat-sealed seam. In connection with the heat-sealing of vinyl resins of the type produced by the conjoint polymerization mixtures of a vinyl halide and vinyl acetate or other vinyl ester of an aliphatic acid, cyclohexanone gives excellent results, although at the highest operating rates it is sometimes desirable to use a solvent mixture containing approximately equal parts by weight of propylene oxide and cyclohexanone. Among such vinyl resins may be mentioned those produced by the processes described in United States Patent No. 2,055,468 of S. D. Douglas; in United States Patent No. 2,064,565 of E. W. Reid; and in the pending application, Serial No. 342,266 of J. P. Ferrer and S. D. Douglas relating to "Plastic composition."

The very close control of the amount of solvent fed to the heat-sealing zone, and the provision of means which permits such control of exceedingly small amounts of solvent are important and novel features of the invention. Any uncontrolled irregularity in the feed of the solvent, or any delay in the beginning or stopping of the solvent feed at the beginning and end of a heat-sealing operation, may result in serious injury to the material being heat-sealed, and weaken the heat-sealed joint. To exemplify the small amount of solvent required, about 0.6 cubic inch of a mixture of equal parts of cyclohexanone and propylene oxide was used in making a hem seam in vinyl films at the rate of ten feet per minute, in a continuous operation lasting five hours.

The temperature and pressure applied at the heat-sealing zone are varied in accordance with such factors as the film thickness, the type of seam, and the rate of movement of the film past the sealing rolls. Thus, when heat-sealing films of the aforesaid vinyl resin 0.004 inch in thickness, pressure roll temperatures ranging from 240° to 280° F., in conjunction with roll pressures of from 0.5 pound to 100 pounds, when using 1.5 inch diameter rolls having face widths of 0.31 inch, have given strong, tenacious lap seams; while temperatures around 400° F. are useful when producing the same heat-sealed seam at a rate around 40 feet per minute. Films of still greater thickness than that mentioned may be heat-sealed at speeds higher than 40 feet per minute, utilizing roll temperatures within the range between 300° and 800° F., and total roll pressures within the range between 0.5 pound and 100 pounds, for films ranging between 0.002 inch and 0.062 inch in thickness. Pressure roll temperatures within the range between 190° and 450° F. are particularly efficacious when sealing thin film at rates between 4 and 50 feet per minute. An optimum balance of pressure and temperature exists for each film thickness and type of heat-sealing procedure.

The strength of the resultant heat-sealed seams may be considerably improved by aging the finished seam at around room temperature. The aging may be accelerated by passing the seamed material through a drying oven maintained at a suitable temperature, such as a temperature between 60° and 100° C.

In the accompanying drawings, which illustrate one preferred form of heat-sealing apparatus of the invention, Fig. 1 is a front elevation, partly in section, of heat-sealing apparatus and associated parts, portions being broken away;

Fig. 2 is a diagrammatic view of means for controlling the feed of solvent to the sealing zone, and means for controlling the temperature of the sealing rolls, for separating the rolls, and for driving the rolls;

Fig. 3 is a fragmentary perspective view of two heat-sealing rolls, solvent feed lines, and associated film-aligning guides;

Fig. 4 is a fragmentary sectional view of the aligning guides of Fig. 3, with two films to be united in place prior to the sealing operation;

Fig. 5 is a perspective view of another form of guide and associated parts for aligning and applying solvent to the margins of two films to be joined by a butt seam;

Fig. 6 is a sectional view of a portion of the fixture of Fig. 5, showing two films to be sealed;

Fig. 7 is a transverse section through one of the pressure rolls and associated parts;

Fig. 8 is a somewhat diagrammatic side elevation of two pairs of heated pressure rolls arranged in tandem, designed to form two sealed seams in close succession;

Fig. 9 is a sectional view, taken along the line 9—9 of Fig. 8, looking in the direction of the arrows; and Fig. 10 is a sectional view, taken along the line 10—10 of Fig. 8, looking in the direction of the arrows.

Referring to Fig. 1, numeral 11 designates a gooseneck frame, much similar to the frame of the usual sewing machine, supported upon a suitable table 13 or the like, which in turn is mounted on supporting members (not shown). Mounted on the free forward end of member 11, for vertical sliding movement in a slideway 15, is a pressure roll-supporting member 17. For moving member 17 vertically, a cable 19 has an end secured to member 17, and then passes over a sheave 21 journalled for rotation in an arm 23 on gooseneck member 11. The other end of cable 19 is secured to a peripheral margin of cable drum 25, the latter of which is pivotally mounted for rotation on bearing 27 secured to member 11. Drum 25 has an arm 29 pivotally secured to an iron core 31 of a solenoid S through link member 32. A counterweight 33 is supported on arm 29 for movement along the latter.

The arrangement of parts is such that, when the solenoid S is not energized, the counterweight 33 raises the member 17 and separates the pressure rolls 37 and 39. When the solenoid S is energized by current flowing through the windings 35 the arm 29 and counterweight 33 are raised, thereby lowering the upper roll-supporting member 17 and the roll carried thereby, thus bringing that sealing roll into contact with the lower roll 39, and causing a uniform, selected pressure to be exerted between the rolls.

The mechanism for driving the respective pressure rolls 37, 39 at a selected uniform rate comprises an electric motor 41 driven from a suitable source of current through line 43. The motor 41 is connected with roll 37 through suitable gearing, including reduction gears 45, 47, 49, shaft 51, bevel gears 53, 55, shaft 57, bevel gears 59, 61, shaft 63, universal joint 65, shaft 67, universal joint 69, shaft 71, bevel gears 73, 75, shaft 77, bevel gears 79, 81, pinion gears 82, 83, 84, and shaft 85. Pressure roll 39 is driven by motor 41 through reduction gears 45, 47, 49, shaft 51, reduction gears 86, 87, 88, and shaft 89, the latter being supported in bearings on table 13 in suitable manner (not shown).

For moving past the sealing rolls the sheets of thermoplastic material to be joined, there are provided conveyor belts 91, 92 supported on suitable rolls 93, 94, and driven by motor 41 through pulley 95, V-belt 96, pulley 97 and shaft 98.

Each of the aforesaid shafts is journalled in suitable bearings (not shown). The rate of movement of the conveyor belts is synchronized with the peripheral speed of the rolls 37, 39.

As more clearly shown in Fig. 7, each of the pressure rolls 37, 39 consists of a sleeve of electric-insulating material 100 secured upon one of the respective shafts 85, 89. Secured upon the latter at respective ends thereof are metal connector rings 101, 101'. These in turn are spaced from a corresponding central heating ring 103, 103 of suitable heat-conductive metal by the respective insulating washers 105, 105. The midportion of the outer peripheral surface of each ring 103, 103 is grooved, and houses a corresponding called electric resistance element 107, 107', one end of which is connected with connector ring 101, and the other is connected with connector ring 101'. An annular heat-sealing ring 109 of suitable refractory material or of heat-conductive metal surrounds each heating ring 103 and is secured thereto in suitable manner. As illustrated in Fig. 3, two or more rings 109 having beveled lateral margins on the work-contacting surfaces may be substituted for each of the rings 109 shown in Fig. 7. Electric current for heating each of the sealing rolls is conducted to the respective resistance elements 107, 107' through graphite carbon brushes 110, 110' from a source of electric current hereinafter more particularly described.

Referring to Fig. 2, wherein is shown a preferred wiring arrangement of parts used for driving the moving parts of the apparatus, and for heating the sealing rolls and controlling the feed of solvent to the heat-sealing zone, line current flowing in line 43 from a suitable source is conducted to motor 41 through branch circuit 111 having therein a switch 113. For regulating the amount of heat flowing to the pressure rolls 37, 39, the electric heating elements 107, 107' of the respective pressure rolls are connected together in parallel, and are electrically connected to low voltage heating transformer 115, one of the lead wires 117 being connected with the end of the secondary coil of transformer 115. The other lead wire 119 leads from the respective elements 107, 107' to the breaker arm 121 of a relay 123 of well-known type.

The secondary coil of the transformer 115 is provided with two taps 124, 125, each of which is adjustable longitudinally of the secondary coil for varying the portion of the voltage induced by the transformer that flows to the heating elements 107, 107'. The primary coil of the transformer is directly connected with the main electric circuit 43 through lines 122. Tap 124 is electrically connected with a breaker point 126 of the relay by conduit 128; and tap 125 is connected with breaker point 127 through conduit 130. An electromagnet 129 is energized by a current flowing through the branch line 131 which is connected with branch electric circuit 111 when switch 113 is closed. The portion of lead line 119 connected with the resistance element of roll 39 is provided with a variable resistance 133 for regulating the current flowing through heating coil 107' independently of that flowing through coil 107.

A spring 135 maintains breaker arm 121 in contact with breaker point 126, excepting when the electromagnet 129 is energized, at which time the arm contacts breaker point 127. Thus, it will be seen that, when switch 113 closes the electric circuit to start the motor 41, electromagnet 129 is energized, pulling contact arm 121 downward, breaking contact with breaker point 126 and closing contact with breaker point 127. Thus the entire secondary current induced in transformer 115 flows to the heat-sealing rolls and provides a relatively high voltage effective for maintaining the heating rolls at the selected high temperature required during a heat-sealing operation. Closing of the switch 113 also energizes the electromagnet S, thereby raising the lever 29 and causing a selected pressure to be exerted between the pressure rolls 37, 39.

Upon opening switch 113, upon completion of the sealing operation, the electromagnet 129 is de-energized, and spring 135 returns member 121 into contact with breaker point 126, thus reducing the voltage of the induced secondary current flowing through roll-heating elements 107, 107' to a selected value. Concurrently solenoid S is de-energized, whereby counterweight 33 raises the head 17 and upper sealing roll 37 out of contact with the lower roll 39. Thus, the contact of the hot rolls with the heat-sensitive films is interrupted and the roll temperature reduced concurrently with discontinuance of the heat-sealing operation, thereby preventing injury to the film of resinous material such as would result from prolonged contact with the heat-sealing rolls.

For continuously feeding small amounts of a solvent to the heat-sealing zone at a preselected rate, there is provided a reservoir 137 for the solvent, connected through a conduit 139 with a header 140 provided with one or more fine tubes 141 having tiny passages therethrough, which may be of capillary size and may be provided with corresponding orifices. A flow-regulating valve 143 and a solenoid-controlled cut-off valve 145 are disposed in conduit 139. The solvent reservoir illustrated is provided with a storage chamber 147 connected with a flexible conduit 148 to the mid portion of the side of the reservoir whereby, during operation, a uniform head of pressure is maintained on the solvent flowing from the reservoir. A gas-bleeder cock (not shown) may be placed at each high point in solvent line 139 to prevent any possible irregularity in the flow of solvent to the sealing zone due to trapping of gas or vapor in this line.

For instantly cutting off the discharge of solvent from the tubes 141 when no film is between the rolls during operation of the motor 41, there is provided a normally closed micro-switch 149, mounted on the side of the frame 11 near sliding member 17. Switch 149 is adapted to be opened by an adjustable contact member 150 supported on an arm 151 secured to member 17. The switch 149 is connected in circuit 111, and has associated therewith a transformer 152, the secondary coil 153 of which is in circuit with the solenoid coil of valve 145. The arrangement of parts is such that when the heat-sealing rolls 37, 39 do not have between them a film of material to be heat-sealed, the electric circuit that energizes valve 145 is broken at switch 149, and that valve closes. Thus, all flow of solvent to the heat-sealing zone is instantly interrupted. The micro-switch operates with a movement of arm 151 which is 0.001 inch or less, and with a pressure differential of two ounces or more.

It will be observed that solenoid-operated valve 145 is provided with a dual control, first, by the current driving motor 41, and secondly, by micro-switch 149. The solvent is controlled volumetrically by metering valve 143. The volume of solvent thus metered generally is of the order of 0.0005 to 0.002 cubic inch per minute for a single lap seal made at a rate of around 5 linear feet per minute; while 0.01 to 0.04 cubic inch of solvent may be fed per minute when making a double seal at rates around 40 linear feet per minute. The solvent passes through feed line 139 to dispenser needle or tube 141, that is in light pressure contact with the lower film, and is applied upon the upper surface of the lower film while the latter is being covered by the upper film at the heat-sealing zone (see Fig. 3). Film directly beneath the needle is unsupported from below.

The invention is well adapted for the heat-sealing operations forming a wide variety of types of seams, among which may be mentioned lap seams, butt seams, hems, edge lap seams, center lap seams, duplex edge seams, duplex butt seams, overlap butt seams, inserted cord seams, inserted cord binding seams, etc.

Fig. 3 illustrates an arrangement of pressure rolls and associated parts in association with a lap seam-aligning fixture. The latter comprises a holder plate 160, adjustably secured to table 13 by suitable means (not shown) for alignment of a margin of the plate with a transverse plane through the roll face. Secured to a margin of the plate 160, and lying in a transverse plane through the rolls 37, 39 is a flat guide member 162. The latter has secured thereto a curved channel plate 164 adapted to cooperate with member 162 to provide a guide for a margin of one of the sheets 168 to be joined. Solvent dispenser tubes or needles 141, fed from solvent line 139, are disposed at points closely adjacent the sealing rolls, and between the latter and the margins of the guide plates 162, 164 adjacent the rolls. The dispenser needles are shaped and directed so as to lie below the level of member 162 and to project beyond the end of the latter near the sealing roll. The lower film 166 passing beneath member 162 thus contacts the downwardly directed open ends of dispenser needles 141, and receives the solvent as the two films 166, 168 meet as they enter the sealing rolls.

Figs. 5 and 6 illustrate a butt seam-aligning fixture comprising a holder plate 170 having along one side margin a guide and separator 172 adapted to cooperate with the adjacent edge of holder 170 to guide the margins of lower and upper films 166, 168 under and over the separator so as to keep the hollow solvent needles 141 between the films as they approach the sealing rolls. The guide 172 keeps the films apart and keeps the solvent needles uniformly in contact with the lower film immediately adjacent the sealing rolls. The solvent tubes or needles 141 extend from header 140 through grooves 173 in holder plate 170, and thence laterally along the underside of guide 172, as shown in Fig. 5.

Other seaming guides and attachments for use in association with the solvent dispensing needles or capillary tubing may be provided for making a wide variety of types of seams in accordance with the invention.

Although the foregoing description has been directed principally to a heat-sealing apparatus provided with upper and lower sealing heads, and with a single set of two sealing rolls, it will be understood that the invention is not limited to the use of a single set of rolls. Indeed, the invention has special utility where two or more such heat-sealing units are used in parallel or in tandem for multiple heat-sealing operations. Thus, by arranging two or more sets of sealing rolls so as to rotate on a single pair of shafts it is readily possible to heat-seal two or more seams simultaneously.

Fig. 8 illustrates more or less diagrammatically a tandem arrangement of pairs of heat-sealing rolls A, B and A', B'; and Figs. 9 and 10 illustrate one form of combined hem seam and butt seam which may be made by this arrangement of parts. As the films leave rolls A, B, a heat-sealed zone 174 is formed at a point spaced some distance from the lateral end margin of film 166. The marginal portion 176 is then folded over by a suitable guide member (not shown) to the position shown in Fig. 10 just prior to passing between the sealing rolls A', B'. Here another sealing operation is performed, resulting in a second heat-sealed zone 178, and the formation of a lateral sealed passage 179 for a cord or the like extending along the margin of the article thus produced.

It will be understood that other forms of apparatus may be substituted for that here shown for purposes of illustration. Thus a rotary heat-sealing fixture may be employed for sealing two circular discs or films of thermoplastic material along a curvilinear path. In such an arrangement a rotatable work-supporting plate preferably is used, adapted to support the circular discs or films and to feed the margins thereof between the heat-sealing rolls hereinbefore described. The rotatable work-supporting means may be driven mechanically in suitable manner from a central shaft secured thereto, or the work support may be in the form of a turntable which is driven by the heat-sealing rolls through the films being heat-sealed. Such apparatus and procedure may readily be employed for inserting and heat-sealing cords or elastic strips in shower capes, covers for containers, and other similar articles.

An important feature of the invention resides in the use of the variable resistance 133 in the electric circuit employed for heating the sealing rolls. This variable resistance permits an independent adjustment in the voltages of the heating current supplied to the respective upper and lower sealing rolls. It has been discovered that, due to certain inherent characteristics of thermoplastic resinous materials, such as vinyl resins, when two or more plastic films are passed between heated rolls, the resultant composite film normally adheres to the hotter roll. It has now been established that, when the upper sealing roll is maintained at a slightly higher temperature than the lower roll, the heat-sealed film is prevented from being carried between the fixture plate and the lower roll as otherwise commonly occurs, necessitating the stopping of the operation, and possibly resulting in injury to the heat-sealed film. Indeed, when the upper roll is somewhat hotter than the other, the weight of the film actually facilitates the continuous stripping of the film from the upper roll as the operation proceeds. In practice it has been found preferable to utilize a temperature differential within the range from 10° to 15° F. for most convenient operation.

In certain heat-sealing operations, such as those conducted at the lower rates, it often is advantageous to heat one roll only, the other roll being unheated. In such instance the uppermost roll is heated to a suitable temperature within the range hereinbefore mentioned. The apparatus illustrated in Figs. 1 and 2 may be adapted for this one-source heating operation by connecting a switch in one of the lead lines 117, 119.

By the practice of the present invention it is at last possible to produce on a commercially practicable basis heat-sealed seams of great strength, permanently uniting thin films of thermoplastic materials commonly used in the manufacture of such articles as shower curtains, wearing apparel and a wide variety of other articles. The seams thus provided are impervious to water and air, and possess high strength and durability in service. During the heat-sealing operation, any failure of the power driving the sealing rolls automatically removes the sealing rolls from contact with the heat-sensitive films being joined by sealing, reduces the heat generated at the respective rolls, and concurrently cuts off the flow of solvent to the heat-sealing zone.

The invention is susceptible of modification within the scope of the appended claims.

I claim:

1. Continuous method for permanently uniting films and sheets of thermoplastic resin with the formation of strong, durable but inconspicuous seams, which comprises bringing together and overlapping the portions of the surfaces of the sheets to be united, continuously applying at a substantially constant rate between such surfaces immediately adjacent a heat-sealing zone a minute selected amount of a volatile organic softening agent for the resin, immediately thereafter briefly applying in said sealing zone a selected pressure to said portions at the seam thus formed while concurrently supplying a selected amount of heat to the outer surface of at least one of the sheets, and promptly thereafter withdrawing the resultant heat-sealed sheets from the sealing zone.

2. Continuous method for permanently uniting films and sheets of vinyl resins with the formation of strong, durable but inconspicuous seams, which comprises bringing together and overlapping marginal portions of the surfaces of the sheets to be united, continuously applying at a uniform rate between such surfaces at a heat-sealing zone a selected amount of a volatile organic softening agent for the vinyl resin, substantially concurrently therewith briefly applying at said heat-sealing zone a selected pressure to said portions of the sheets at the seam thus formed while supplying a selected amount of heat to the free surface of at least one of the sheets, and promptly thereafter progressively withdrawing the resultant heat-sealed product from the sealing zone.

3. Method for permanently uniting films of thermoplastic material with the formation of strong, durable, water-impervious seams during continuous movement of such films past a heat-sealing zone, which comprises feeding to and past such a zone successive overlapping portions of two films of such material to be united, continuously and uniformly feeding a small amount of a volatile organic softening agent for the thermoplastic material between such successive overlapping portions closely adjacent said heat-sealing zone in a uniform discharge from an enclosed source of supply of such softening agent maintained under a low, uniform pressure-head, immediately thereafter contacting such surfaces at said heat-sealing zone and briefly pressing such surfaces together under a low pressure applied to outer surfaces of said overlapping portions, concurrently with such application of pressure briefly applying heat to said outer surfaces on opposite sides of said films under conditions providing a temperature differential between the respective outer surfaces, and withdrawing from the heat-sealing zone successive portions of the resultant permanently united films.

4. Continuous method for permanently uniting films of heat-sensitive thermoplastic vinyl resin material with the formation of strong, durable, water-impervious seams, which comprises continuously feeding to and past a heat-sealing zone successive overlapping portions of two films of such resin material to be united, continuously and uniformly supplying by gravity a small selected amount of a volatile organic softening agent for the thermoplastic resin material between the surfaces to be united immediately prior to the arrival of such surfaces at said heat-sealing zone from a source of supply of the softening agent maintained under a selected low pressure-head, immediately thereafter contacting said surfaces and briefly applying a low selected pressure to said successive superposed portions at said zone, and concurrently with said application of pressure briefly supplying heat to the respective surfaces containing said softening agent by conduction through said vinyl resin films under conditions heating the surface of the uppermost film to a temperature higher than the lowermost surface of the underlying film.

5. Continuous method for permanently uniting films of heat-sensitive thermoplastic vinyl resin material with the formation of strong, durable but inconspicuous seams, which comprises continuously bringing successive overlapping portions of surfaces of the films to be united to a heat-sealing zone, continuously applying uniformly between such successive surface portions a minute selected amount of a volatile organic solvent for the thermoplastic vinyl resin material from a source of solvent supply maintained under a selected low superatmospheric pressure while said portions are free from pressure, immediately thereafter contacting such moving surface portions at said heat-sealing zone and briefly applying a selected pressure to said portions while concurrently briefly supplying a selected amount of heat to successive portions of the free surfaces of the respective films at the seam thus formed from two independent heating sources in contact with said free surfaces and disposed respectively on opposite sides of such films, the heat thus supplied upon the free surface of one film being greater than that supplied to the opposite surface of the other film being united therewith.

6. Continuous method for permanently uniting films of a heat-sensitive thermoplastic vinyl resin with the formation of strong, durable, inconspicuous seams, which comprises continuously bringing together successive overlapping portions of superposed films to be united during movement of such films to a heat-sealing zone, continuously and uniformly feeding between such successive portions while out of contact with each other a minute selected amount of a volatile organic solvent for such resin from an enclosed source of solvent supply maintained under a fixed low pressure, immediately thereafter briefly applying a selected pressure to said successive portions at the seam thus formed and concurrently briefly supplying a selected amount of heat to the respective free surfaces of the films forming the seam from two independent sources of heat disposed respectively on opposite sides of the films, the heat thus supplied upon the uppermost free surface of one film being greater than that supplied to the opposite surface of the lowermost film being united therewith.

7. Continuous method for permanently uniting films and sheets of a thermoplastic vinyl resin with the formation of a strong, durable and water-impervious seam, which comprises bringing to a heat-sealing zone successive overlapping vertically-spaced portions of the sheets to be united, while continuously applying between said spaced portions while free from pressure a small selected amount of a volatile solvent for said vinyl resin boiling within the range between 80° C. and 160° C. and comprising a ketone, from a source of solvent supply continuously maintained under a selected low pressure-head, immediately thereafter at said heat-sealing zone contacting said overlapping portions and briefly applying a selected pressure thereto and concurrently briefly supplying a selected amount of heat to the respective free surfaces of the contacting portions of the sheets from two independent sources of heat disposed respectively on opposite sides of the respective sheets, and promptly thereafter withdrawing the resultant permanently united sheets from the sealing zone.

8. Continuous method for permanently uniting films of a thermoplastic vinyl resin with the formation of strong, durable, water-impervious seams, which comprises continuously feeding to and past a heat-sealing zone successive overlapping portions of two films to be united at a rate between around four feet and around fifty feet per minute, during movement of the films to said heat-sealing zone and immediately adjacent said zone continuously applying a selected small amount of a volatile organic softening agent for the thermoplastic vinyl resin material upon at least one of the surfaces of said portions to be united while the latter are free from pressure, immediately thereafter at said heat-sealing zone contacting said surfaces and briefly applying a selected pressure to said overlapping portions of the films, and concurrently briefly heating the successive contacting portions of the films at the seam thus formed by contacting free surfaces of such successive portions with heating surfaces respectively maintained at temperatures within the range between around 190° F. and around 450° F., and thereafter releasing said pressure and removing successive portions of the heat-sealed seam from said heat-sealing zone.

9. Continuous method for permanently uniting films and sheets of thermoplastic materials with the concurrent formation of a strong, durable, welded seam having a laterally-disposed sealed passage, during movement of such films past a succession of heat-sealing zones, which comprises continuously feeding to a first heat-sealing zone successive portions of two such films with a marginal portion of one film disposed immediately above and closely adjacent an intermediate portion of the second film to be united, continuously supplying at a uniform rate between the said marginal and intermediate portions to be heat-sealed, immediately prior to arrival of said portions at said heat-sealing zone, a small amount of a volatile organic softening agent for the thermoplastic material, immediately thereafter overlapping said portions and applying pressure to said overlapping portions to permanently weld the contacting surfaces together, then releasing such pressure, folding a marginal portion of said second film into contact with a second surface zone of the other film, continuously supplying at a uniform rate a small amount of a volatile organic softening agent for the thermoplastic material between the surfaces to be contacted immediately prior to such contact, continuously feeding the contacting surfaces past a second heat-sealing zone while briefly applying a low pressure to said contacting portions at said second zone, during the last-named application of pressure briefly supplying heat to said second heat-sealing zone from heat sources respectively disposed on opposite sides of said films, and withdrawing from said second heat-sealing zone a film having a permanently welded seam provided with a sealed passage extending along a margin thereof.

10. Apparatus for uniting thin films and sheets of thermoplastic material, which comprises means for feeding films of such material past a heat-sealing station; means adjacent said station for continuously contacting successive portions of one of said films at a selected rate with corresponding portions of another film to be united therewith; means at said station for continuously supplying a volatile organic solvent at a selected rate between successive contacting portions of the moving surfaces to be heat-sealed; means at said station for applying a low pressure to the overlapping portions of the films; means for supplying heat to the exposed surfaces of the overlapping portions of the respective films; and means providing a selected temperature differential between the respective exposed surfaces of the said portions of said films.

11. Apparatus for uniting thin films and sheets of thermoplastic material, which comprises means for feeding films of such material past a heat-sealing station; means adjacent said station for superposing a margin of one of said films upon a margin of another film to be united therewith, means at said station for supplying a volatile organic solvent at a selected rate between successive portions of the moving surfaces to be heat-sealed; means at said station for applying a low pressure to the overlapping margins of the films; means for supplying heat to the exposed surfaces of the overlapping margins of the respective films; and automatic means operatively associated with said film-feeding means for releasing said pressure applying means, and actuated when said film-feeding means is rendered inoperative.

12. Apparatus for uniting thin films and sheets of thermoplastic material, which comprises means for feeding films of such material past a heat-sealing station; means adjacent said station for superposing a margin of one of said films upon a margin of another film to be united therewith, means at said station for supplying a volatile organic solvent at a selected rate between successive portions of the moving surfaces to be heat-sealed; means at said station for applying a low pressure to the overlapping margins of the films; means for supplying heat to the exposed surfaces of the overlapping margins of the respective films; and automatic means operatively associated with said film-feeding means for reducing the heat supplied by said heat-supplying means when said film-feeding means is inoperative.

13. Apparatus for uniting thin films and sheets of thermoplastic material, which comprises means for feeding films of such material past a heat-sealing station; means adjacent said station for superposing a margin of one of said films upon a margin of another film to be united therewith, means at said station for supplying a volatile organic solvent at a selected rate between successive portions of the moving surfaces to be heat-sealed; means at said station for applying a low pressure to the overlapping margins of the films; means for supplying heat to the exposed surfaces of the overlapping margins of the respective films; and automatic means operatively associated with said film-feeding means for cutting off the flow of solvent to the said surfaces to be heat-sealed when said film-feeding means is inoperative.

14. Apparatus for uniting thin sheets and films of heat-sensitive thermoplastic materials, which comprises means for feeding films of such material at a selected rate past a heat-sealing station; means for superposing successive selected portions of one of said films upon corresponding portions of another film; means at said station for supplying a volatile solvent at a selected rate between the successive portions to be heat-sealed; at least one pair of heat-sealing rolls at said station for applying a selected pressure to the overlapping portions of said films; means for heating each of said rolls; and automatic means operatively associated with said film-feeding means for releasing the pressure exerted by the heat-sealing rolls, for separating said rolls, and for reducing the heat supplied to the respective heat-sealing rolls when the film-feeding means is inoperative.

15. Apparatus as defined in claim 11, together with mechanism for heating one roll of each pair to a selected elevated temperature higher than that of the other roll of such pair.

16. Apparatus for uniting thin sheets and films of heat-sensitive thermoplastic material, which comprises means for feeding films of such material at a selected rate past a heat-sealing station; means for superposing a selected zone of one of said films upon a corresponding zone of another film; means at said station for supplying a volatile solvent at a selected rate between successive portions of said zones of the moving films to be heat-sealed; at least one pair of heat-sealing rolls at said station for applying a selected pressure to overlapping zones of said films; means for heating each of said rolls; and automatic mechanism operatively associated with the film-feeding means and actuated for cutting off the flow of solvent to said moving surfaces being heat-sealed when the film-feeding means is rendered inoperative.

17. Apparatus for uniting thin sheets and films of heat-sensitive thermoplastic materials, which comprises means for feeding films of such material at a selected rate past a heat-sealing station; means for superposing a selected zone of one of said films upon a corresponding zone of another film; means at said station for supplying a volatile solvent at a selected rate between successive portions of the said zones of the moving films to be heat-sealed; at least one pair of heat-sealing rolls at said station for applying a selected pressure to overlapping zones of said films; means for heating each of said rolls; and automatic mechanism operatively associated with said heat-sealing rolls for cutting off the feed of solvent when no films are positioned between said rolls.

18. Apparatus for uniting thin films and sheets of thermoplastic material, which comprises means for continuously feeding films of such material past a heat-sealing station; means adjacent said station for continuously contacting and overlapping successive portions of one of said films at a uniform rate with corresponding portions of another film to be united therewith; means at said station for continuously supplying a volatile organic solvent at a uniform rate between successive contacting portions of the moving surfaces to be heat-sealed; means at said station for applying a low pressure to the overlapping portions of the films; and means for supplying heat to the exposed surface of the overlapping portion of at least one of said films.

19. Apparatus for uniting thin films and sheets of thermoplastic material, which comprises means for feeding films of such material past a heat-sealing station; means adjacent said station for continuously contacting successive portions of one of said moving films at a selected rate with corresponding portions of another film to be united therewith; means at said station for continuously supplying a volatile organic solvent at a uniform selected rate between successive contacting portions of the moving surfaces to be heat-sealed, the last-named means including a solvent reservoir, means for maintaining the solvent in said reservoir at a constant level, solvent discharge means having a passage of capillary size, and a valve-controlled conduit connecting said reservoir and said solvent discharge means; means at said heat-sealing station for applying a low pressure to the contacting portions of the films; and means for supplying heat to the contacting portions of the respective films through the films.

LEE CONRAD HOSFIELD.

CERTIFICATE OF CORRECTION.

Patent No. 2,343,975. March 14, 1944.

LEE CONRAD HOSFIELD.

It is hereby certified that error appears in the printed specification of the above numbered patent requiring correction as follows: Page 2, first column, line 37, before "mixtures" insert --of--; page 3, first column, line 52, for "called" read --coiled--; page 7, first column, line 70, for the claim reference numeral "11" read --14--; and that the said Letters Patent should be read with this correction therein that the same may conform to the record of the case in the Patent Office.

Signed and sealed this 16th day of May, A. D. 1944.

Leslie Frazer (Seal) Acting Commissioner of Patents.